(12) United States Patent
Garimella et al.

(10) Patent No.: US 8,095,751 B2
(45) Date of Patent: Jan. 10, 2012

(54) MANAGING SET OF TARGET STORAGE VOLUMES FOR SNAPSHOT AND TAPE BACKUPS

(75) Inventors: Neeta Garimella, San Jose, CA (US); James P. Smith, Redwood City, CA (US)

(73) Assignee: International Business Machines Corporation, Armonk, NY (US)

( * ) Notice: Subject to any disclaimer, the term of this patent is extended or adjusted under 35 U.S.C. 154(b) by 752 days.

(21) Appl. No.: 11/364,101

(22) Filed: Feb. 28, 2006

(65) Prior Publication Data

US 2007/0204120 A1    Aug. 30, 2007

(51) Int. Cl.
*G06F 12/00* (2006.01)
*G06F 13/00* (2006.01)
*G06F 13/28* (2006.01)

(52) U.S. Cl. .............................. 711/162; 711/4; 707/644
(58) Field of Classification Search .................. 711/162
See application file for complete search history.

(56) References Cited

U.S. PATENT DOCUMENTS

| | | | |
|---|---|---|---|
| 5,664,186 A * | 9/1997 | Bennett et al. ................ 707/204 |
| 5,758,067 A * | 5/1998 | Makinen et al. ................ 714/54 |
| 6,073,222 A | 6/2000 | Ohran | |
| 6,081,875 A | 6/2000 | Clifton et al. | |
| 6,594,744 B1 * | 7/2003 | Humlicek et al. ............ 711/162 |
| 6,938,056 B2 | 8/2005 | Burns et al. | |
| 7,237,056 B2 * | 6/2007 | Gold et al. ........................ 711/4 |
| 2003/0188104 A1 * | 10/2003 | Sullivan ........................ 711/119 |
| 2004/0199549 A1 | 10/2004 | Oksanen | |
| 2005/0102480 A1 * | 5/2005 | Yagisawa et al. ............. 711/162 |
| 2005/0182910 A1 | 8/2005 | Stager et al. | |
| 2006/0282627 A1 * | 12/2006 | Aggarwal et al. ............. 711/154 |

OTHER PUBLICATIONS

Cox et al., "Pastiche: Making Backup Cheap and Easy", USENIX Assoc., 5th Symposium on Operating Systems Design and Implementation, 2003, pp. 285-298.
Riedel, "Storage Systems—Not Just a Bunch of Disks Anymore", QUEUE, Jun. 2003, pp. 33-41, ACM.
Cooper et al., "Peer-to-Peer Data Trading to Preserve Information", ACM Transactions on Information Systems, vol. 20, No. 2, Apr. 2002, pp. 133-170.

* cited by examiner

*Primary Examiner* — Brian Peugh
*Assistant Examiner* — Prasith Thammavong
(74) *Attorney, Agent, or Firm* — Cantor Colburn LLP; Feb Cabrasawan

(57) ABSTRACT

A mechanism using special properties on data containers of a snapshot backup allows the snapshot backup used for a tape backup to be excluded from the policy enforcement. In addition, reconciliation of a local (client-side) backup repository and server repository bypass the snapshot backup to ensure its validity for the backup duration. If the snapshot backup is to be retained, the data container may be brought back under the domain of policy management. The policy clause may stipulate that a snapshot cannot be recycled while it is being used for a tape backup, allowing tape backups to be prioritized over subsequent snapshot backups.

18 Claims, 6 Drawing Sheets

MANAGING SET OF TARGET STORAGE VOLUMES FOR SNAPSHOT AND TAPE BACKUPS

BACKGROUND OF THE INVENTION

1. Field of the Invention

This invention relates to data backup in a computer system. Particularly, this invention relates to managing storage space for snapshot backups.

2. Description of the Related Art

Making backups of computer data is often a critical function for any business to provide for the safe recovery of data that may be compromised or destroyed through accidents or deliberate acts. Conventional backups to tape (or other media) involve performing a complete copy of specified data. However, it is often not practical to perform a full backup at each backup interval. So, it is typical for incremental backups to be made where only the data that has changed since the last full backup is backed up. Thus, when a restore of the backup data is necessary, the last full backup as well as all incremental backups since must be utilized. Depending upon the number of incremental backups, the task quickly becomes extremely timeconsuming.

Known snapshot backups operate somewhat differently than simply making a full copy of specified data and subsequent incremental backups in a traditional manner. Through special handling of the data, a snapshot backup comprises a virtually perfect copy of the data at a specific point in time, a "picture" of the data taken at a specified instant, typically without regard to the amount of data being backed up. Effectively, a snapshot backup operates by only backing up the changes that have occurred. In addition, only the differences in the data are transferred across the backup connection, greatly reducing the overhead required to operate a snapshot backup compared to a traditional backup. In one sense, snapshot backups completely reverse a traditional backup process by functioning with only changed data increments. Snapshot backup technology has continued to develop over recent years.

U.S. Patent Application 20050182910 by Stager et al., published Aug. 18, 2005, discloses a method for adding redundancy to a continuous data protection system beginning by taking a snapshot of a primary volume at a specific point in time, in accordance with a retention policy. The snapshot is stored on a secondary volume, and the snapshot is cloned and stored on a third volume. The cloned snapshot is eventually expired according to a cloning policy.

U.S. Pat. No. 6,073,222 by Ohran, issued Jun. 6, 2000, discloses a system and method for using a virtual device established at a computer system to access data as it existed at a selected moment in a mass storage system associated with the computer system, regardless of whether new data has been written to the mass storage system. When an original data block is to be overwritten in the mass storage system with a new data block, the original data block is first preserved in a preservation memory associated with the computer system. The preservation memory thereby preserves the original data block as it existed at the selected moment. A virtual device established at the computer system provides access to data as it existed at the selected moment. This data may include original data blocks preserved in the preservation memory and other original data blocks that remain in the mass storage device, and which have not been overwritten with new data. In order to provide access to the data, the virtual device accesses the preservation memory to obtain those original data blocks that have been preserved therein and also accesses the mass storage device to obtain those original data blocks that remain in the mass storage device.

U.S. Pat. No. 6,081,875 by Clifton et al., issued Jun. 27, 2000, discloses a backup system and method that provides for creation of a reconciled snapshot backup image of a database while the database, residing on a disk array system, is in use by users. A backup computer running a commercial backup utility is connected between the array system and a tape storage system. While the backup is underway, write requests to the database are suspended until the data currently in those data blocks is copied and stored in an original data cache. The disk system address of the copied block and a pointer to the location of the block in the cache are stored in a map. The backup utility incrementally reads portions of the database from the disk system and forwards those portions to the tape system. Prior to each portion being forwarded to the tape system, all data blocks in the portion which have an address that corresponds to the address of a block in the cache are discarded and replaced with the data from the cache for that address.

Cox et al., "Pastiche: Making Backup Cheap and Easy", USENIX Association, 5$^{th}$ Symposium on Operating Systems Design and Implementation, 2003, pp. 285-98, discloses Pastiche, a simple and inexpensive backup system. Pastiche exploits excess disk capacity to perform peer-to-peer backup with no administrative costs. Each node minimizes storage overhead by selecting peers that share a significant amount of data. it is easy for common installations to find suitable peers, and peers with high overlap can be identified with only hundreds of bytes. Pastiche provides mechanisms for confidentiality, integrity, and detection of failed or malicious peers. A Pastiche prototype suffers only 7.4% overhead for a modified Andrew Benchmark, and restore performance is comparable to cross-machine copy.

Riedel, "Storage Systems—Not Just a Bunch of Disks Anymore," QUEUE, ACM, June 2003, pp. 32-42, discusses the larger storage systems that are typically detached from the server hosts—the specialized appliances that form the core of data centers everywhere. Riedel introduces the layers of protocols and translations that occur as bits make their way from the magnetic domains on the disk drives and interfaces to desktop computers.

Cooper et al., "Peer-to-Peer Data Trading to Preserve Information," ACM Transactions on Information Systems, Vol. 20, No. 2, April 2002, pp. 133-170, discusses how a network of autonomous archiving sites can trade data to achieve the most reliable replication. A series of binary trades among sites produces a peer-to-peer archiving network. Two trading algorithms are examined, one based on trading collections (even if they are different sizes) and another based on trading equal sized blocks of space (which can then store collections). The concept of deeds is introduced; deeds track the blocks of space owned by one site at another. Policies for tuning these algorithms to provide the highest reliability, for example by changing the order in which sites are contacted and offered trades, are discussed. Finally, simulation results are presented that reveal which policies are best. The experiments indicate that a digital archive can achieve the best reliability by trading blocks of space (deeds), and that following certain policies will allow that site to maximize its reliability.

Use of snapshot technology to provide advanced data protection solutions has been growing rapidly to provide capabilities such as near instant backup, near instant restore, multiple snapshot-based backups to provide multiple fast recovery points. The snapshot technology provider under such environment may be any layer in the storage stack such as the file-system, volume manager, or storage subsystem. A data protection solution under this environment, such as Tivoli Data Protection (TDP) for hardware for DB2, mySAP, and Oracle, will have to manage the storage space used for creating the snapshot backups in accordance with the policy. However, managing snapshot storage space together for snapshot backups and tape backups presents some limitations with conventional implementations.

Users implementing these advanced data protection solutions may frequently perform snapshot based backups, e.g. every two hours, and maintain multiple versions of these snapshot backups to provide increased recoverability. Typically, these snapshot backups exist on the same storage as the data being protected. In some cases, the backups may even have dependency on the validity of the source data (e.g. software based copy-on-write snapshots) for the backup to be valid. Therefore, the snapshot based backups may only provide limited data protection and require use of traditional tape-based backup methods at a lesser frequency, e.g. nightly, for a complete data protection solution.

Tape backups may also utilize snapshot technology to create a point-in-time copy of the data, which is then used to move the data to the tape. The data movement process can be performed from an alternate system to reduce backup impact on a production system. However, the snapshot must stay active for the duration of the tape backup. In addition, the storage used for this snapshot cannot be reused for any other purposes (such as generating a new snapshot backup or another tape backup) until the tape backup is complete, a process which can take hours.

These foregoing factors present problems in managing the snapshot storage space in the context of policy based operation that must ensure that the snapshot used by a tape backup remains valid for the backup duration. Also, if a snapshot needs to be retained as a valid backup, it must be subjected to the policy enforcement where it could become eligible for reuse per the policy.

Existing data protection for hardware products support snapshot and tape backups which are limited to only one snapshot. When performing a tape based backup, another backup (e.g. the next backup) cannot be performed until the current backup is completed. Depending on the backup duration, this limits backup frequency.

In view of the foregoing, there is a need in the art for systems and methods for snapshot backups that manage a snapshot storage space in the context of policy based operation while ensuring that the snapshot used by a tape backup remains valid for the backup duration. Further, there is a need for such systems and methods to provide a snapshot backup while subjected to policy enforcement where the snapshot can become eligible for reuse under the policy. There is also a need for such systems and methods to manage more than one simultaneous snapshot backup. As detailed hereafter, these and other needs are met by the present invention.

SUMMARY OF THE INVENTION

Embodiments of the present invention operate under the condition that a snapshot used for tape backup cannot be managed under policy used for snapshot based backup. Embodiments of the invention provide a mechanism applying special properties to the data containers of this snapshot to allow it to be excluded from the policy enforcement. (As used herein, a data container comprises a storage unit used for a snapshot.) The reconciliation of local (e.g., client-side) backup repository and server repository must bypass this snapshot to ensure its validity for the backup duration. If a snapshot is to be retained as backup, embodiments of the invention allow this data container to be brought back under the domain of policy management. Embodiments of the invention may also include a special clause in the policy that a snapshot cannot be recycled while it is being used for a tape backup. Therefore allowing tape backups to be prioritized over subsequent snapshot backups.

A mechanism using special properties on data containers of a snapshot backup allows the snapshot backup used for a tape backup to be excluded from the policy enforcement. In addition, reconciliation of a local (client-side) backup repository and server repository bypass the snapshot backup to ensure its validity for the backup duration. If the snapshot backup is to be retained, the data container may be brought back under the domain of policy management. The policy clause may stipulate that a snapshot cannot be recycled while it is being used for a tape backup, allowing tape backups to be prioritized over subsequent snapshot backups.

A typical embodiment of the invention comprises a computer program embodied on a computer readable medium, including program instructions for applying one or more properties to a data container for a snapshot backup of one or more data sets, and program instructions for excluding the data container from policy enforcement based on the applied one or more properties. The data container may be selected from a plurality of available data containers specified in a backup manager policy employed by a backup manager ensuring that any incomplete tape backup does not become invalid.

In further embodiments, the one or more properties of the data container comprise a use property indicating that the data container is in use. In addition, the one or more properties of the data container may comprise a backup type property indicating that the backup type is either a snapshot backup, a tape backup, or a dual snapshot and tape backup. The backup type property may be updated to comprise a snapshot backup after a tape backup completes to include the data container back in the policy enforcement. Thus, the backup type property may be used to bring a data container employed for a dual (or tape only) backup back under the policy domain once the tape backup has finished.

Typically, the data container resides on a local repository and one or more backup objects are created on a server repository, each backup object comprising a reference property corresponding to the data container on the local repository. The reference property uniquely identifies the snapshot backup in the local repository. The one or more backup objects may comprise only a snapshot backup object. Alternately, the one or more backup objects may comprise only a tape backup object. In this case, the tape backup object comprises a state property indicating a tape backup is in progress and reconciliation of the local repository and the server repository bypasses the data container in response to the state property indicating the tape backup is in progress.

In yet another example, the one or more backup objects may comprise both a snapshot backup object and a tape backup object. Here also, the tape backup object comprises a state property indicating a tape backup is in progress and reconciliation of the local repository and the server repository bypasses the data container in response to the state property indicating the tape backup is in progress.

Wherever a tape backup object is created, the tape backup object may comprise a state property updated to indicate the tape backup is complete. The data container of the local repository is then made available for reuse in response to the updated state property indicating the tape backup is complete.

Similarly, a typical method embodiment of the invention comprises applying one or more properties to a data container for a snapshot backup of one or more data sets, and excluding the one or more data containers from policy enforcement based on the applied one or more properties. Method embodiments of the invention may be further modified consistent with the program and system embodiments of the invention described herein.

BRIEF DESCRIPTION OF THE DRAWINGS

Referring now to the drawings in which like reference numbers represent corresponding parts throughout.

DETAILED DESCRIPTION OF THE PREFERRED EMBODIMENT

1. Overview

As previously mentioned, one of the problems addressed by embodiments of the present invention is in the area of managing snapshot storage space together for snapshots backups and tape backups. Tape backup snapshots must stay active for the duration of the tape backup. In addition, the storage used for this snapshot cannot be reused for any other purposes (such as generating a new snapshot backup or another tape backup) until the tape backup is complete, a process which can take hours.

Also, a conventional snapshot storage space in the context of policy based operation must ensure that the snapshot used by a tape backup remains valid for the backup duration. If a snapshot needs to be retained as a valid backup, it must be subjected to the policy enforcement where it could become eligible for reuse per the policy. Existing data protection for hardware products support snapshot and tape backups which are limited to only one snapshot. When performing a tape based backup, another backup (e.g. the next backup) cannot be performed until the current backup is completed. Depending on the backup duration, this limits backup frequency.

Embodiments of the present invention operate under the condition that a snapshot used for tape backup cannot be managed under policy used for snapshot based backup. Embodiments of the invention provide a mechanism applying special properties to the data containers of this snapshot to allow it to be excluded from the policy enforcement. The reconciliation of local backup repository and server repository must bypass this snapshot to ensure its validity for the backup duration. (Note that the reconciliation process essentially synchronizes the repositories on a client and server system. The entries that are represented only in one repository are deleted.) If a snapshot is to be retained as backup, embodiments of the invention allow this data container to be brought back under the domain of policy management. Policy management in this context is typically performed both by the client and the server component of the backup manager.

Embodiments of the invention may also include a special clause in the policy that a snapshot cannot be recycled while it is being used for a tape backup. Therefore allowing tape backups to be prioritized over subsequent snapshot backups.

Figure 1:
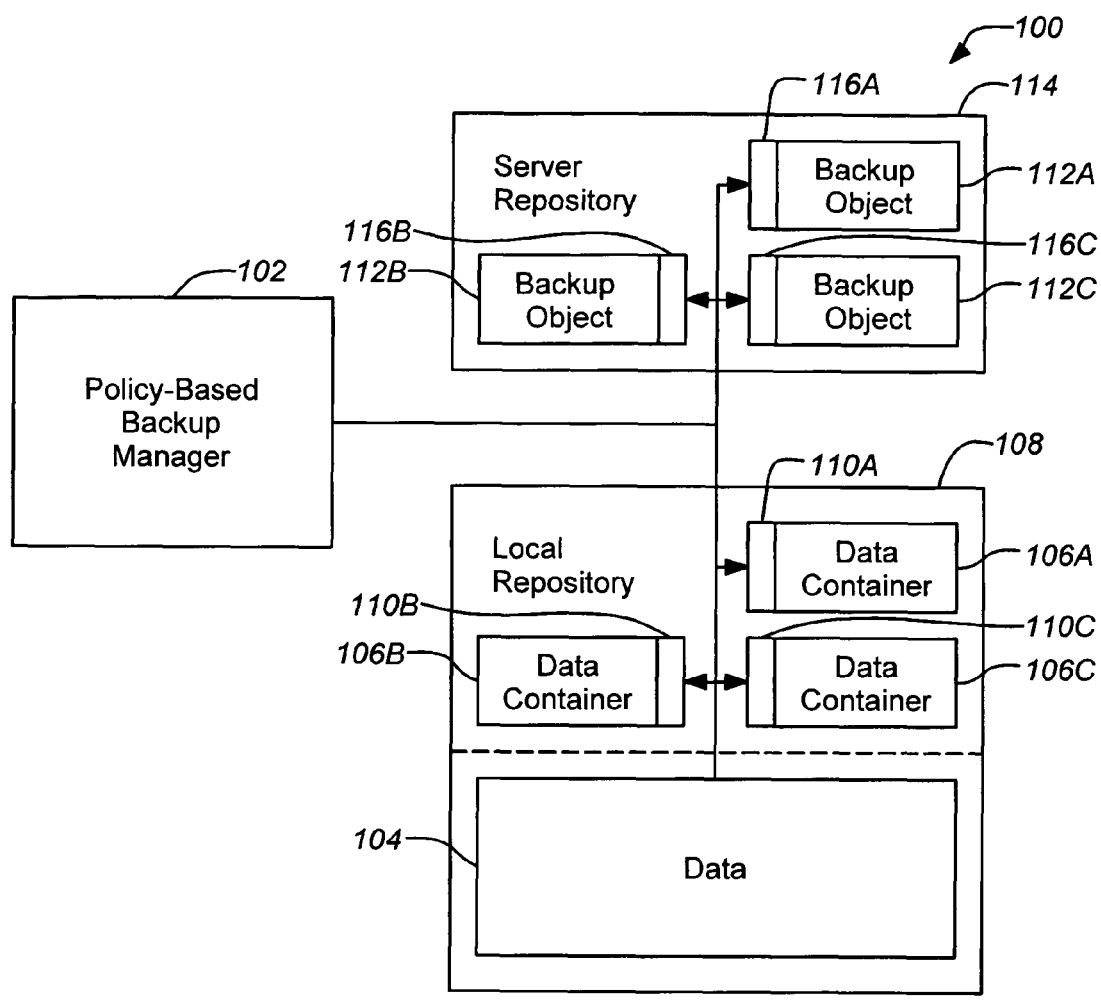
FIG. 1 is a functional block diagram of a typical embodiment of the invention.

FIG. 1 is a functional block diagram of a typical embodiment of the invention. The backup system 100 operates under a backup manager 102 that facilitates the creation of backups of data 104 (e.g. a data sets or a database file) based on one or more policies set by a user (e.g. an administrator). Typically, the backups may be snapshot and/or tape backups. For example, a policy may be set to indicate the maximum number of snapshot backups and separately the maximum number of tape backups that may be created with the backup system 100.

A requested backup of the data is made directly into a snapshot backup on one (e.g. 106A) of a plurality of free data containers 106A-106C in the local repository 108 where the data 104 resides. The type of backup (e.g. snapshot only, tape only or snapshot and tape) is specified in properties 110A including a use property (indicating the data container 106A is currently being used) associated with the data container 106A. Each data container 106A-106C has properties 110A-110C applied which are used by the policy-based backup manager 102.

A matching backup object 112A is then created on a server repository 114 of the data container 106A. Thus, backup objects 112A-112C on the server repository 114 may be associated with data containers 106A-106C on the local repository 108. The backup objects 112A-112C on the server repository each comprise a reference property 116A-116C corresponding to their respective data container 106A-106C in the local repository. Note that in the case of a dual "snapshot and tape" backup type, two backup objects are created on the server repository, one for the snapshot backup and one for the tape backup. Thus, backup objects 112B and 112C may both correspond to single data container 106B, for example. Note also that although FIG. 1 shows three data containers 106A-106C and three backup objects, embodiments of the invention encompass a backup manager 102 facilitating any number of data containers and backup objects.

If the type of backup includes a tape backup, the properties 110A-110C of the applicable backup object 112A-112C will include a status property indicating that the tape backup is "in progress" until the tape backup is complete. Upon completion, the status property will be updated to indicate the backup is "complete" and only then will the associated data container with the snapshot backup be released under the policy management to be recycled and reused by the backup manager 102. In this backup system 100 multiple snapshot and tape backups can be managed simultaneously, provided enough data containers and backup space is available.

2. Hardware Environment

Figure 2A:
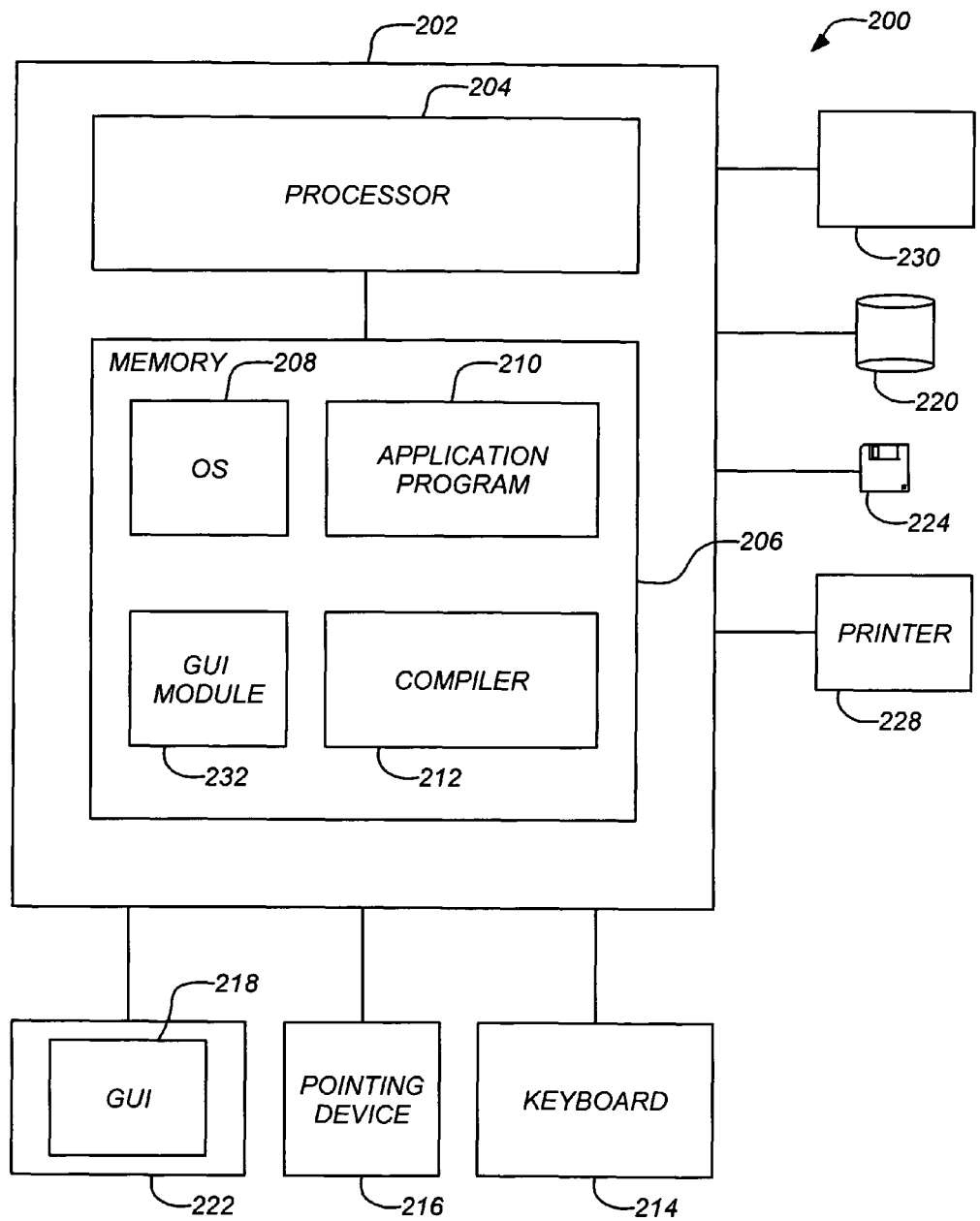
FIG. 2A illustrates an exemplary computer system that can be used to implement embodiments of the present invention.

FIG. 2A illustrates an exemplary computer system 200 that can be used to implement embodiments of the present invention. The computer 202 comprises a processor 204 and a memory 206, such as random access memory (RAM). The computer 202 is operatively coupled to a display 222, which presents images such as windows to the user on a graphical user interface 218. The computer 202 may be coupled to other devices, such as a keyboard 214, a mouse device 216, a printer, etc. Of course, those skilled in the art will recognize that any combination of the above components, or any number of different components, peripherals, and other devices, may be used with the computer 202.

Generally, the computer 202 operates under control of an operating system 208 (e.g. z/OS, OS/2, LINUX, UNIX, WINDOWS, MAC OS) stored in the memory 206, and interfaces with the user to accept inputs and commands and to present results, for example through a graphical user interface (GUI) module 232. Although the GUI module 232 is depicted as a separate module, the instructions performing the GUI functions can be resident or distributed in the operating system 208, a computer program 210, or implemented with special purpose memory and processors.

The computer 202 also implements a compiler 212 which allows one or more application programs 210 written in a programming language such as COBOL, PL/1, C, C++, JAVA, ADA, BASIC, VISUAL BASIC or any other programming language to be translated into code that is readable by the processor 204. After completion, the computer program 210 accesses and manipulates data stored in the memory 206 of the computer 202 using the relationships and logic that was generated using the compiler 212. The computer 202 also optionally comprises an external data communication device 230 such as a modem, satellite link, ethernet card, wireless link or other device for communicating with other computers, e.g. via the Internet or other network.

In one embodiment, instructions implementing the operating system 208, the computer program 210, and the compiler 212 are tangibly embodied in a computer-readable medium, e.g., data storage device 220, which may include one or more fixed or removable data storage devices, such as a zip drive, floppy disc 224, hard drive, DVD/CD-rom, digital tape, etc., which are generically represented as the floppy disc 224. Further, the operating system 208 and the computer program 210 comprise instructions which, when read and executed by the computer 202, cause the computer 202 to perform the steps necessary to implement and/or use the present invention. Computer program 210 and/or operating system 208 instructions may also be tangibly embodied in the memory 206 and/or transmitted through or accessed by the data communication device 230. As such, the terms "article of manufacture," "program storage device" and "computer program product" as may be used herein are intended to encompass a computer program accessible and/or operable from any computer readable device or media.

Embodiments of the present invention are generally directed to any software application program 210 that manages backups over a network of computer devices. The program 210 may operate within a single computer 202 or as part of a distributed computer system comprising a network of computing devices. The network may encompass one or more computers connected via a local area network and/or Internet connection (which may be public or secure, e.g. through a VPN connection). Importantly, embodiments of the invention function within the context of policy-based operation which distinguishes allowable functions and/or processes based upon defined properties, such as maximum number of backups to, backup retention period, what storage device to use to store the backups etc.

Generally, a conventional policy enforcement operates by reusing the oldest snapshot storage (data container) when creating a new one where no free data containers are available. This creates a problem when a data container is used by the tape or dual backup, because the data container cannot be reused for next backup until tape backup completes even if it is the oldest backup. In this situation, embodiments of the present invention employ a policy manager that will bypass a data container still being used for a tape backup and go to the next oldest backup for reuse and so on until one not still being used for a tape backup is located.

Figure 2B:
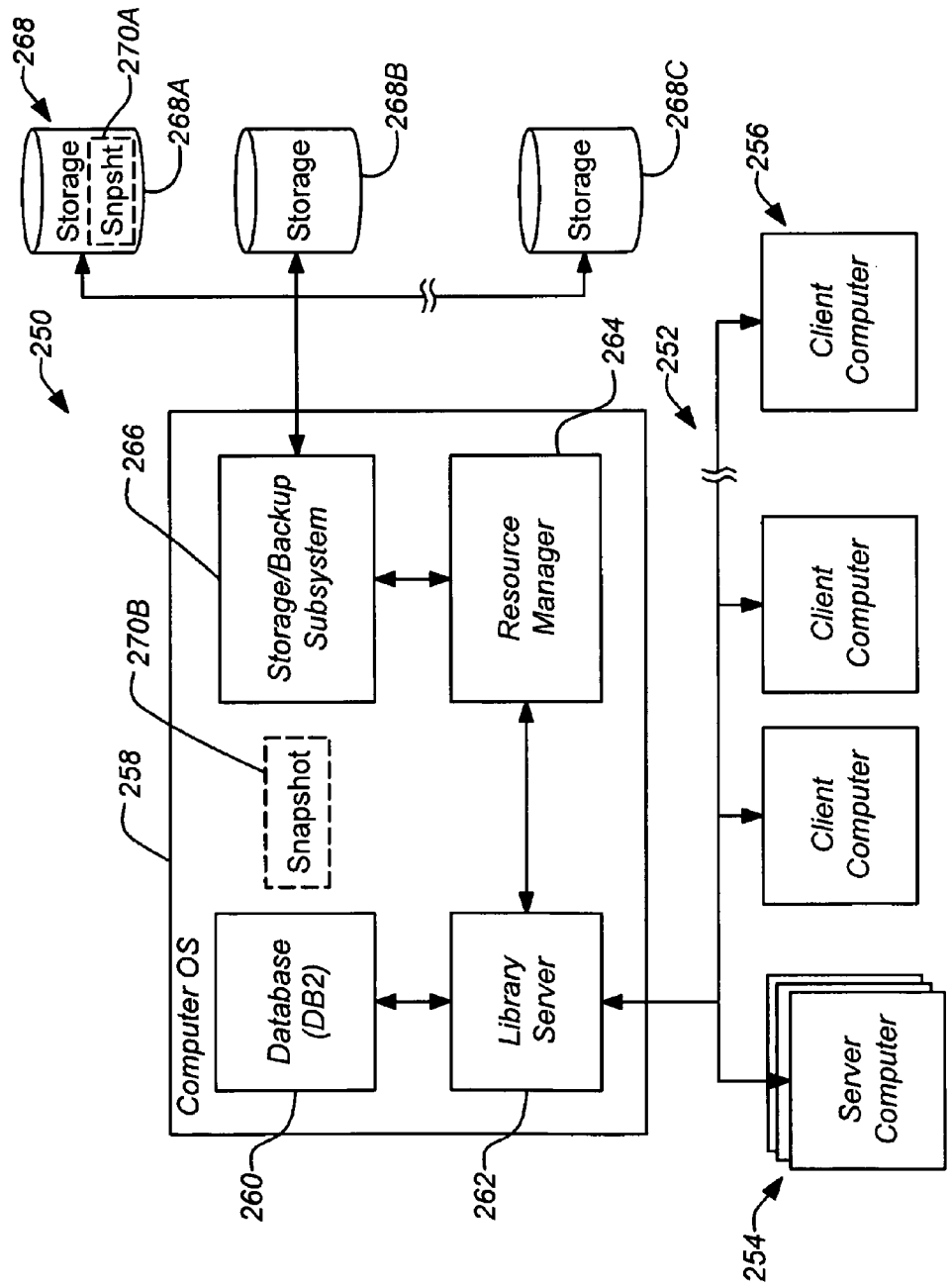
FIG. 2B illustrates an exemplary network of computing devices that can be used with embodiments of the present invention.

FIG. 2B illustrates a typical distributed computer system 250 which may be employed in an typical embodiment of the invention. Such a system 250 comprises a plurality of computers systems 200 which are interconnected through respective communication devices 230 in a network 252. The network 252 may be entirely private (such as a local area network within a business facility) or part or all of the network 252 may exist publicly (such as through a virtual private network (VPN) operating on the Internet). Further, one or more of the computers systems 200 may be specially designed to function as a server or host 254 facilitating a variety of services provided to the remaining client computers 256. In one example one or more hosts may be a mainframe computer 258 where significant processing for the client computers 256 may be performed. The mainframe computer 258 may comprise a database 260 which is coupled to a library server 262 which implements a number of database procedures for other networked computers systems 200 (servers 254 and/or clients 256). The library server 262 is also coupled to a resource manager 264 which directs data accesses through storage/backup subsystem 266 that facilitates accesses to networked storage devices 268A-268C. The networked storage devices 268A-268C may comprise a storage area network (SAN) included devices such as direct access storage devices (DASD) optical storage and/or tape storage indicated as distinct physical storage devices 268A-268C. Various known access methods (e.g. VSAM, BSAM, QSAM) may function as part of the storage/backup subsystem 266.

Embodiments of the invention may operate within the described hardware environment to manage a backups of specified data, which may be files (e.g. database data) on the client computers 256, servers 254 and/or the mainframe computer 258. In a typical embodiment, the backups are managed between a local repository, e.g. on the client computers 256, servers 254 and/or the mainframe computer 258, and server repositories, e.g. the networked storage devices 268A-268C. As described herein, embodiments of the invention utilize a snapshot backup. Typically, the snapshot 270A, 270B may be implemented in the storage devices 268A, within the operating system 258 or within storage on the client computer 256 or server 254 (not shown).

Those skilled in the art will recognize many modifications may be made to this hardware environment without departing from the scope of the present invention. For example, those skilled in the art will recognize that any combination of the above components, or any number of different components, peripherals, and other devices, may be used with the present invention meeting the functional requirements to support and implement various embodiments of the invention described herein.

3. Managing Data Containers for Snapshot and Tape Backups

Embodiments of the invention may be illustrated through a method description of three basic processes, a snapshot only backup, a tape only backup and snapshot and tape backup. Importantly, embodiments of the invention enable these separate processes to operate simultaneously as described hereafter in FIGS. 3A-3C.

To begin, the user of such system may preassign the snapshot storage via a file to a data protection solution (such as the Tivoli Storage Management) such as may be employed in a dynamic management of target volumes for snapshot backup as described in U.S. patent application Ser. No. 11/355,412 by Dutta et al., filed Feb. 16, 2006. The user may also define a policy for snapshot and tape backups separately. For example, a policy may be set that the number of snapshot and tape backups that may be kept are three each and storage space is allocated to maintain three snapshot backups accordingly as one data containers for each snapshot backup. Thus, Number of Snapshot Backups =3, Number of Tape Backups =3 and Number of Data Containers =3, identified as DC1, DC2, DC3.

Figure 3A:
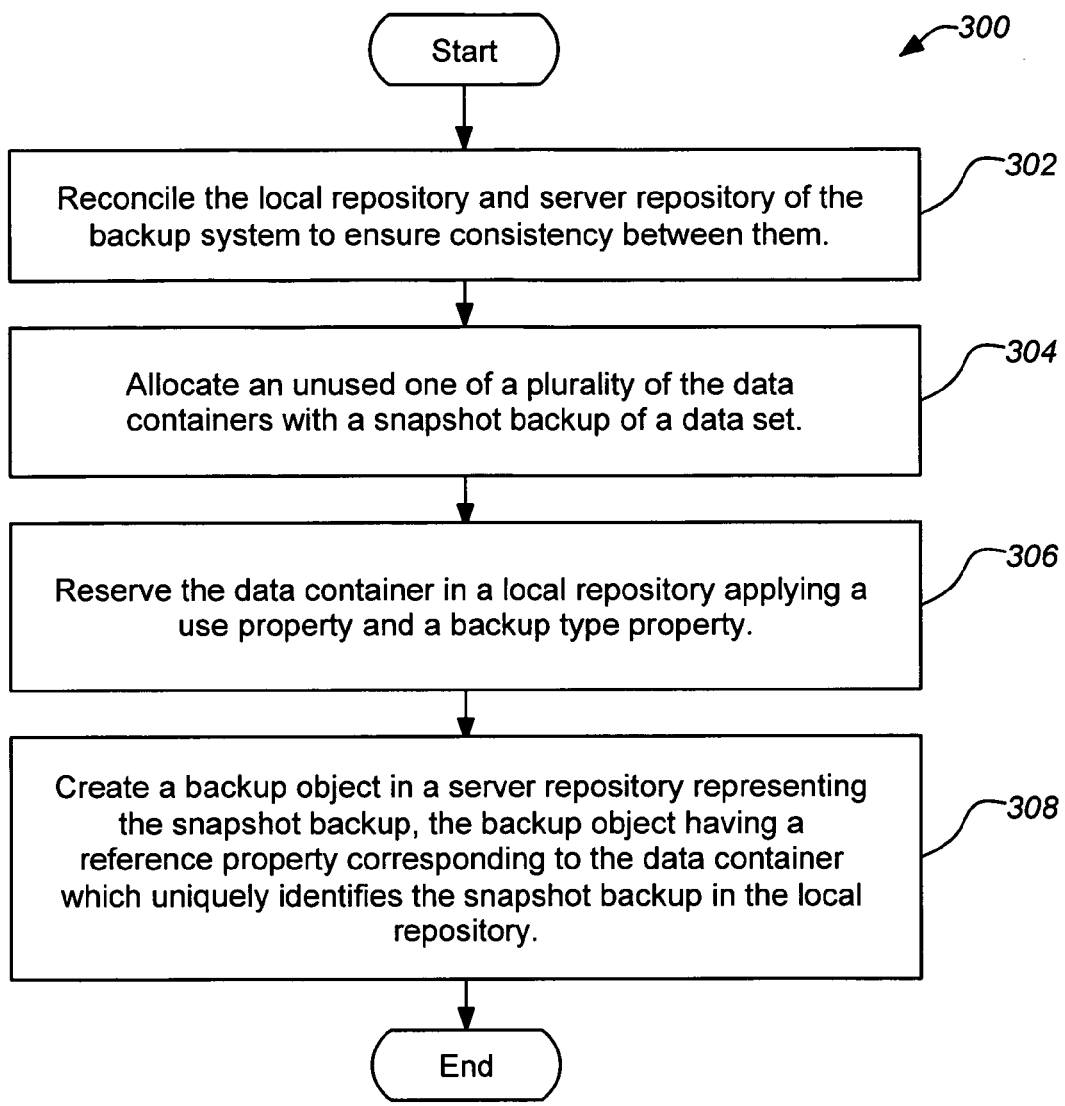
FIG. 3A is a flowchart for performing only a snapshot backup.

FIG. 3A is a flowchart of an exemplary method 300 of performing only a snapshot backup. In operation 302, a reconciliation is performed to ensure consistency between the local repository and server repository of the backup system. See FIG. 1 for a description of the local and server repositories. This reconciliation may be performed as described in U.S. patent application Ser. No. 11/271,037 by Smith et al., filed Nov. 10, 2005. Following this, in operation 304, the system determines the data containers for this new snapshot backup as per the defined policy. This policy-based backup operation may be performed as described in U.S. patent application Ser. No. 11/168,634 by Smith et al., filed Jun. 28, 2005. In operation 306, the system then reserves the data container in a local repository applying a use property (labeling the data container, "IN_USE") and a backup type property (labeling the data container, "SNAPSHOT" backup). As described hereafter, the IN-USE data container in the repository represents a snapshot used for a particular backup type, e.g. a snapshot backup, tape backup, or dual snapshot and tape backup. The system may also apply the snapshot detail properties (e.g. data set identification that the snapshot set represents, snapshot identification on the system that created the snapshot, etc.) to the data container as well. In operation 308, the system creates an object in a server repository representing the snapshot backup. Note that this snapshot backup object on storage management server comprises a reference property corresponding to the data container which uniquely identifies the snapshot backup in the local repository. Note that, in contrast to a tape backup described hereafter, the data container on the local repository for a snapshot backup is not recycled, but remains associated with the backup object on the server repository. The data container remains valid until it is identified by the policy manager to be expired, deleted, or reused.

The snapshot backup at this point is complete. Note that the file transactions of operations 306 and 308 are atomic to ensure consistency between the repositories; the operations are processed completely or not at all. It is important to note that while operations 302-308 are in progress, another instance of the backup application can initiate and reconcile as will be described below respecting the method 330 of FIG. 3C. The reconcile process identifies the data containers in the local repository using the reference kept on the server backup object to mark it as a consistent backup.

Figure 3B:
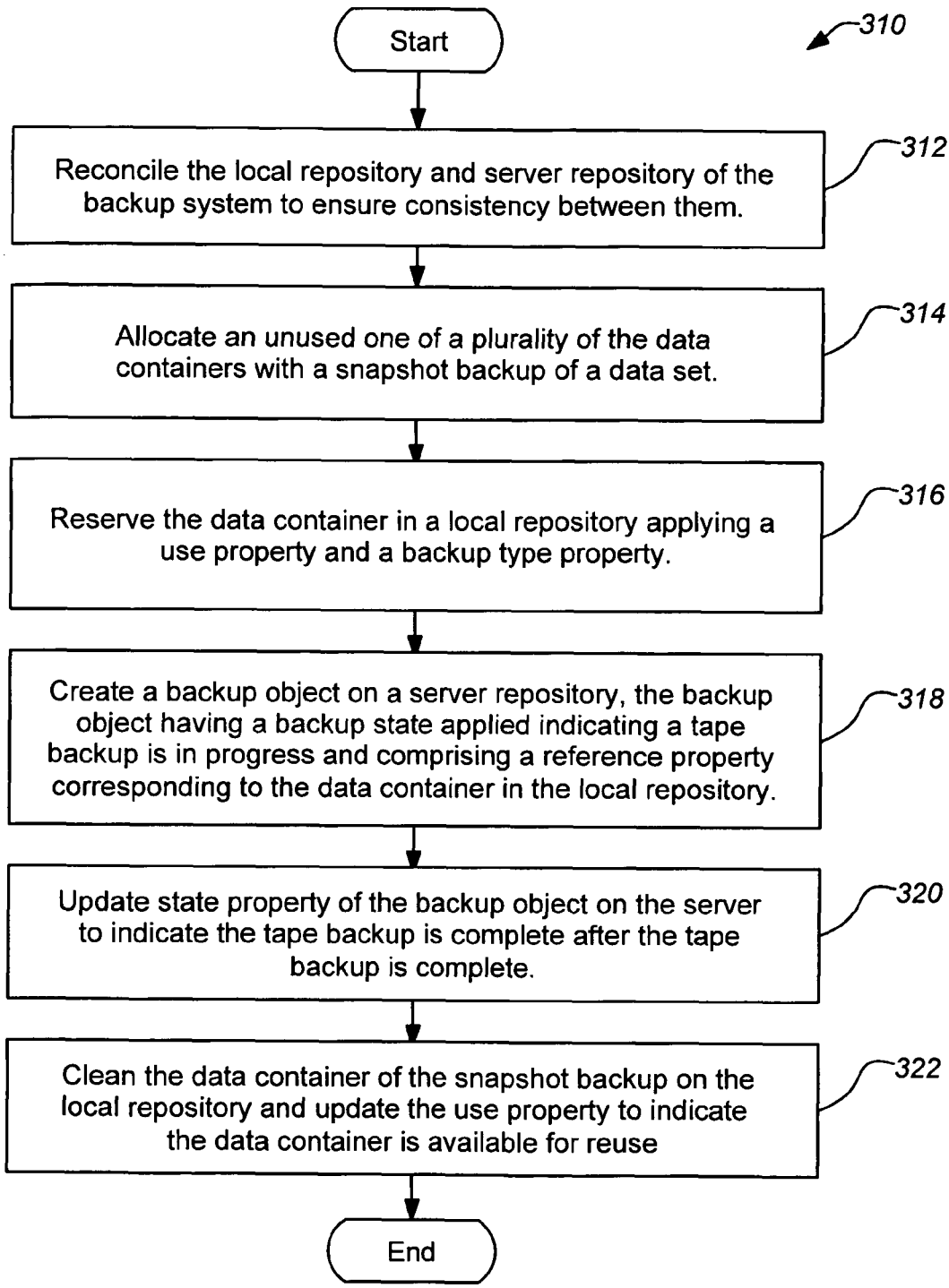
FIGS. 3B is a flowchart for performing only a tape backup.

FIG. 3B is a flowchart of an exemplary method 310 of performing a tape only backup. It should be noted that although the method refers to a "tape only" backup, a snapshot backup to a local repository is still employed to process the tape backup. As such "tape only" refers to the end result of this backup method 310. As with the snapshot only method 300, the tape only backup method 310 begins with operation 312 reconciling the local repository and server repository of the backup system to ensure consistency between them. Next, in operation 314, the system allocates a data container (e.g. DC2) with the snapshot storage for a tape backup, e.g. per a defined policy. Thus, the tape backup also uses a snapshot and the data containers representing the snapshot. In operation 316, the system reserves the data container in a local repository applying a use property (labeling the data container, "IN_USE") and a backup type property (labeling the data container, "TAPE" backup). Although atypical, it is possible that the data container could also include the tape backup details. In operation 318, a backup object is created on a server repository representing the tape backup. In the case of a tape backup, the backup object on the server repository has a backup state applied (indicating the backup is "IN_PROGRESS") and comprises a reference property corresponding to the data container in local repository. Copying of the data set to the server repository continues. In operation 320, the backup object on the server has its state property updated (to indicate the tape backup is "COMPLETE") after the tape backup is complete. Next, in operation 322, the data container of the snapshot backup on the local repository is cleaned and the use property is updated to indicate that the data container is available for reuse.

Note that at any time in the process, e.g. while operations 312 through 318 are in progress, another instance of the backup application can initiate and reconcile as will be described below respecting the method 330 of FIG. 3C. The reconcile process will recognize if the tape backup has an "IN_PROGRESS" state and ensures that corresponding data container (DC2) is still valid. However, if the tape backup is found to have "COMPLETE" state, it skips the validation of data containers as there is no dependency on the data container after the tape backup is complete. It is also possible, that data container (DC2) no longer exists in the local repository while the tape backup is in progress. In that event, the backup object on the server may be deleted.

Figure 3C:
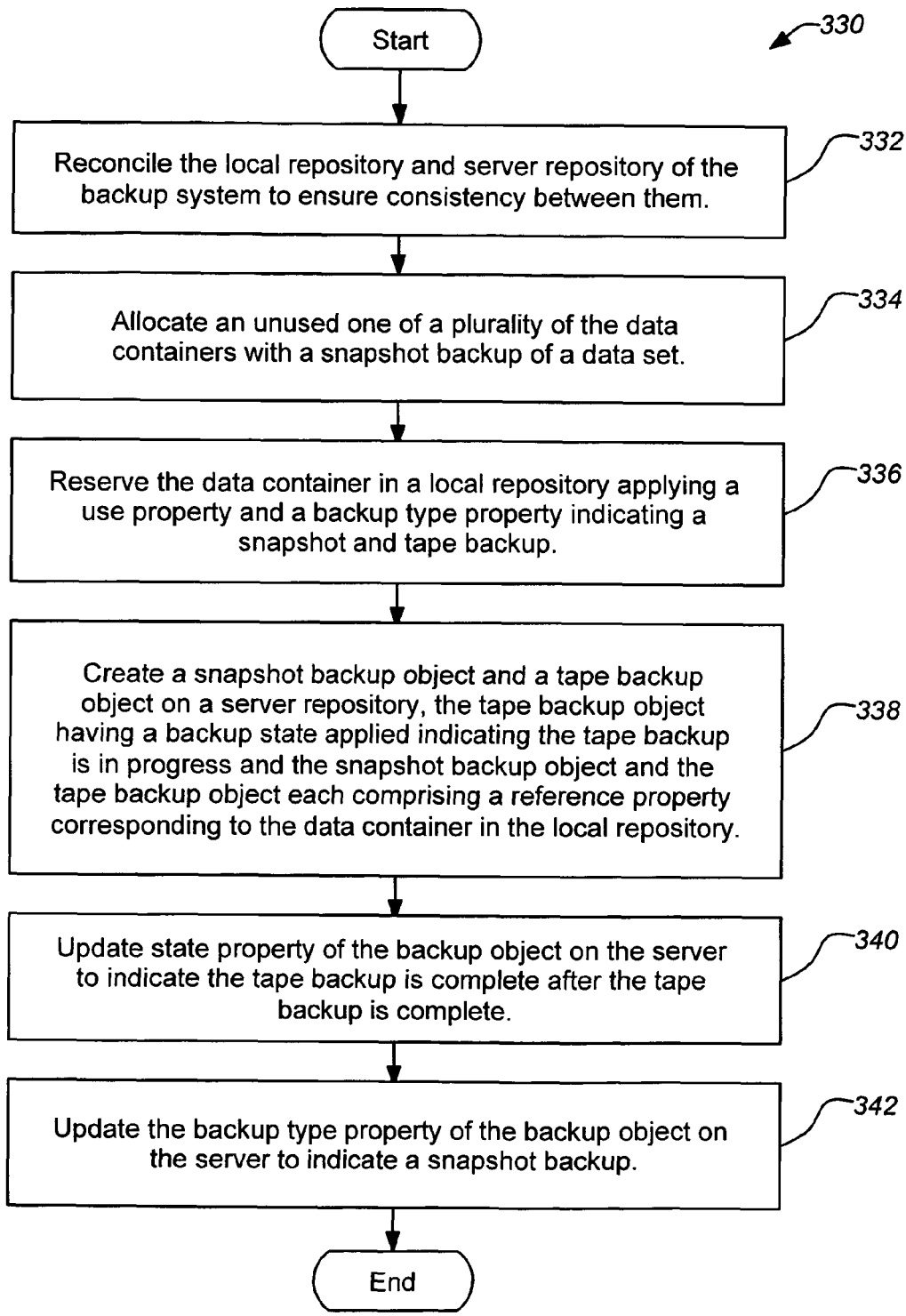
FIG. 3C is a flowchart for performing a snapshot and a tape backup.

FIG. 3C is a flowchart of an exemplary method 330 of performing a snapshot and tape backup together. To illustrate the versatility of an embodiment of the invention, assume that the backup system is already managing backup operations with other data containers, e.g. DC1 is being used for a "SNAPSHOT" backup as described in the method 300 and DC2 is being used for a "TAPE" backup as described in method 310. While operation 328 of the tape backup method 310 is in progress, a user performs a snapshot and tape backup together according to method 330.

As before, the method 330 begins with a process of reconciling both the local and server repositories in operation 332. Under the conditions described, the reconcile process recognizes that the tape backup has an "IN_PROGRESS" state and ensures that corresponding data container (DC2) remains still valid. Next, in operation 334, the system selects another data container (DC3) as snapshot storage for this dual backup. In operation 336, the system reserves the data container in a local repository applying a use property (labeling the data container, "IN_USE") and a backup type property (labeling the data container, "SNAPSHOT_AND_TAPE" backup). In operation 338, a first backup object (corresponding to a snapshot backup) and a second backup object (corresponding to a tape backup) are created on the server repository. The tape backup object has an "IN PROGRESS" state applied. Both the snapshot backup object and the tape backup object comprise a reference to the corresponding data container (DC3) in the local repository. At this point, the snapshot backup using the data container is complete. However, the data copying to server for tape backup continues for a longer period. After the tape backup is complete the tape backup object on the server repository is updated to mark its state as "COMPLETE" in operation 340. Following this, in operation 342, the backup type for the data container is updated to be "SNAPSHOT" in local repository, allowing this to be managed from hereon as a snapshot backup.

As with the previous exemplary methods 300, 310, here also another instance of the backup application can initiate and reconcile while operations 336-340 are in progressing. The reconcile process recognizes the tape backup with "IN_PROGRESS" and ensures that corresponding data container is still valid.

As part of the policy reinforcement, snapshot backups may be recycled to create the new backups. To further illustrate, if an additional snapshot backup is to be performed while a tape backup per method 310 and a dual backup per method 330 are both already occurring, and additional free data container must be available to make space for the new snapshot. The data containers used for tape backups are not subject to being recycled until the backup is complete. In the specific example, being limited to three data containers, the next backup would fail due to the backup system being out of free data containers. Thus, in this example, DC1 remains tied to its respective snapshot, DC2 is not recycled until it's tape backup completes, and DC3 will first be used for both it's respective tape and snapshot backups and then tied to just the snapshot backup after tape backup completes. These applied properties allow the system to exclude the data container from policy enforcement based on the applied one or more properties.

This concludes the description including the preferred embodiments of the present invention. The foregoing description including the preferred embodiment of the invention has been presented for the purposes of illustration and description. It is not intended to be exhaustive or to limit the invention to the precise forms disclosed. Many modifications and variations are possible within the scope of the foregoing teachings. Additional variations of the present invention may be devised without departing from the inventive concept as set forth in the following claims.

What is claimed is:

1. A computer program embodied on a computer readable medium, comprising:
   program instructions for applying one or more properties to a data container for a snapshot backup of one or more data sets, the data container used for both snapshot based backups and tape based backups;
   program instructions for excluding the data container from snapshot backup policy enforcement based on the applied one or more properties; and
   program instructions for bypassing the data container responsive to determining that one of the one or more properties of the data container indicates that the data container is in use, and that the data container is being used for a tape based backup;
   wherein a policy manager facilitates the snapshot backup based on one or more policies and the one or more properties of the data container such that the data container used for a tape based backup cannot be managed under a policy used for a snapshot based backup.

2. The computer program of claim 1, wherein the data container is selected from a plurality of available data containers specified in a backup manager policy employed by a backup manager ensuring that any incomplete tape backup does not become invalid.

3. The computer program of claim 1, wherein the one or more properties comprise a backup type property, wherein the backup property is either a snapshot backup, a tape backup or a dual snapshot and tape backup.

4. The computer program of claim 1, wherein the one or more properties comprise a backup type property, wherein the backup property is updated to comprise a snapshot backup after a tape backup completes to include the data container back in the snapshot backup policy enforcement.

5. The computer program of claim 1, wherein the data container resides on a local repository and one or more backup objects are created on a server repository each backup object comprises a reference property corresponding to the data container on the local repository.

6. The computer program of claim 5, wherein the one or more backup objects comprises only a snapshot backup object.

7. The computer program of claim 5, wherein the one or more backup objects comprises only a tape backup object and the tape backup object comprises a state property indicating a tape backup is in progress and reconciliation of the local repository and the server repository bypasses the data container in response to the state property indicating the tape backup is in progress.

8. The computer program of claim 5, wherein the one or more backup objects comprises both a snapshot backup object and a tape backup object and the tape backup object comprises a state property indicating a tape backup is in progress and reconciliation of the local repository and the server repository bypasses the data container in response to the state property indicating the tape backup is in progress.

9. The computer program of claim 5, wherein the one or more backup objects comprises a tape backup object and the tape backup object comprises a state property updated indicating a tape backup is complete and the data container of the local repository is made available for reuse in response to the state property indicating the tape backup is complete.

10. A method, comprising:
    applying one or more properties to a data container for a snapshot backup of one or more data sets, the data container used for both snapshot based backups and tape based backups; and
    excluding the data container from snapshot backup policy enforcement based on the applied one or more properties; and
    bypassing the data container responsive to determining that one of the one or more properties of the data container indicates that the data container is in use, and that the data container is being used for a tape based backup
    wherein a policy manager facilitates the snapshot backup based on one or more policies and the one or more properties of the data container such that the data container used for a tape based backup cannot be managed under a policy used for a snapshot based backup.

11. The method of claim 10, wherein the data container is selected from a plurality of available data containers specified in a backup manager policy employed by a backup manager ensuring that any incomplete tape backup does not become invalid.

12. The method of claim 10, wherein the data container resides on a local repository and one or more backup objects are created on a server repository each backup object comprises a reference property corresponding to the data container on the local repository.

13. The method of claim 12, wherein the one or more backup objects comprises only a snapshot backup object.

14. The method of claim 12, wherein the one or more backup objects comprises only a tape backup object and the tape backup object comprises a state property indicating a tape backup is in progress and reconciliation of the local repository and the server repository bypasses the data container in response to the state property indicating the tape backup is in progress.

15. The method of claim 12, wherein the one or more backup objects comprises both a snapshot backup object and a tape backup object and the tape backup object comprises a state property indicating a tape backup is in progress and reconciliation of the local repository and the server repository bypasses the data container in response to the state property indicating the tape backup is in progress.

16. The method of claim 12, wherein the one or more backup objects comprises a tape backup object and the tape backup object comprises a state property updated indicating a tape backup is complete and the data container of the local repository is made available for reuse in response to the state property indicating the tape backup is complete.

17. The method of claim 10, wherein the one or more properties comprise a backup type property, wherein the backup property is either a snapshot backup, a tape backup or a dual snapshot and tape backup.

18. The method of claim 10, wherein the one or more properties comprise a backup type property, wherein the backup type property is updated to comprise a snapshot backup after a tape backup completes to include the data container back in the snapshot backup policy enforcement.

* * * * *